United States Patent [19]

Tadano

[11] 3,710,499
[45] Jan. 16, 1973

[54] AUTOMATIC FISHING MACHINE
[75] Inventor: Nobuo Tadano, Miyagi, Japan
[73] Assignee: Suzuki Iron Works Company Limited, Mujagi-ken, Japan
[22] Filed: March 30, 1971
[21] Appl. No.: 129,249

[30] Foreign Application Priority Data

April 23, 1970 Japan ..................................45/34503
July 7, 1970 Japan ..................................45/58953

[52] U.S. Cl. ........................................43/6.5, 43/15
[51] Int. Cl. ...............................................A01k 79/00
[58] Field of Search............43/6.5, 15, 16, 19.2, 27.4

[56] References Cited

UNITED STATES PATENTS

| | | |
|---|---|---|
| 2,523,592 | 9/1950 | Powell et al. ............................43/15 |
| 2,536,576 | 1/1951 | Silva..........................................43/15 |
| 3,138,890 | 6/1964 | Mitchell...................................43/6.5 |
| 3,192,659 | 7/1965 | Rice..........................................43/15 |

*Primary Examiner*—Warner H. Camp
*Attorney*—Kurt Kelman

[57] ABSTRACT

Installed alongside the gunwale of a fishing boat, this machine automatically repeats a fixed cycle of fishing operation which comprises the steps of keeping the fishing pole tip at a fixed height from the surface of the water while waiting for a fish to bite and, upon sensing the bit of a fish at the hook, swinging up the fishing pole to hoist the fish from the sea into the air, subsequently causing the fish to come free of the hook in mid-air above the boat's deck and fall on the deck and, with the release of tension in the line, causing the fishing pole to be immediately lowered to the original position for the next bite.

3 Claims, 27 Drawing Figures

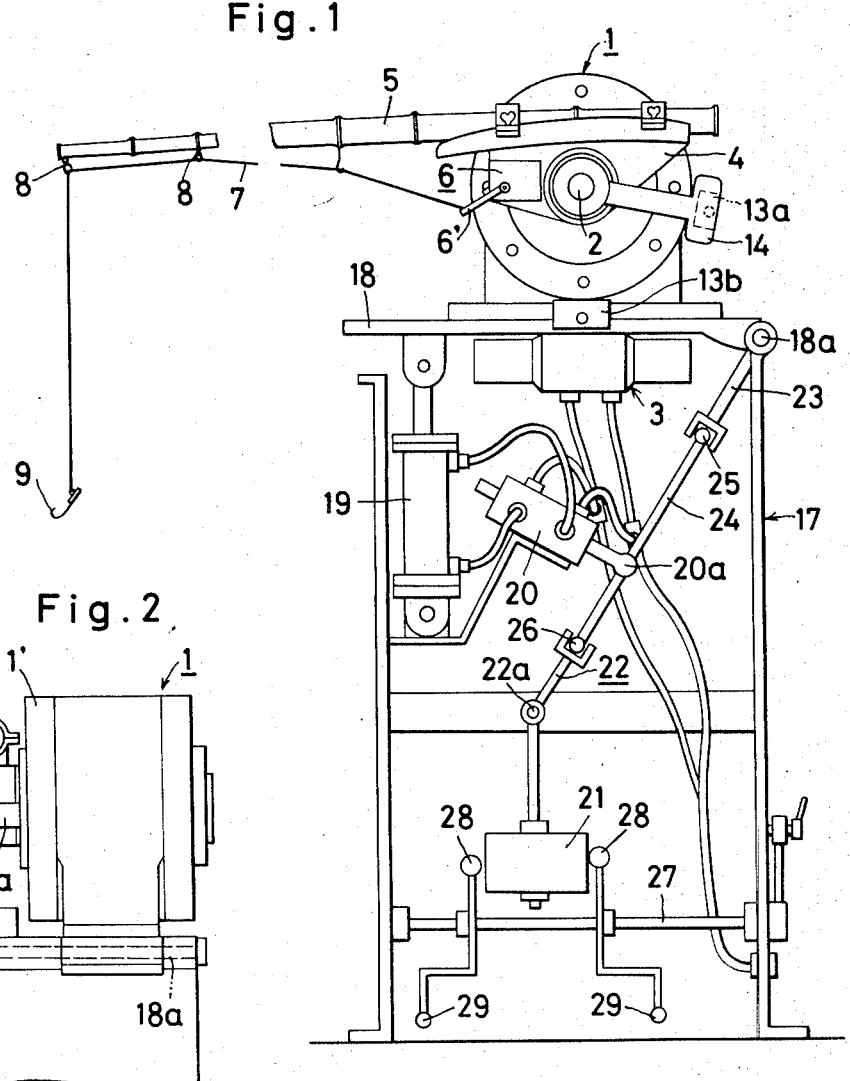
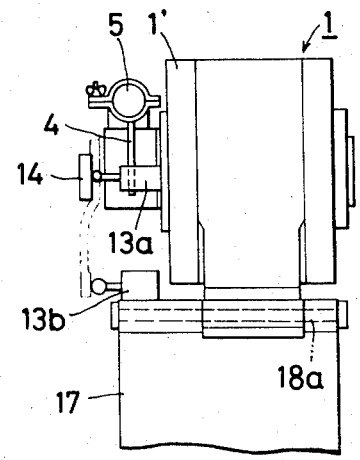
Fig.1
Fig.2

Fig. 9
Fig. 10
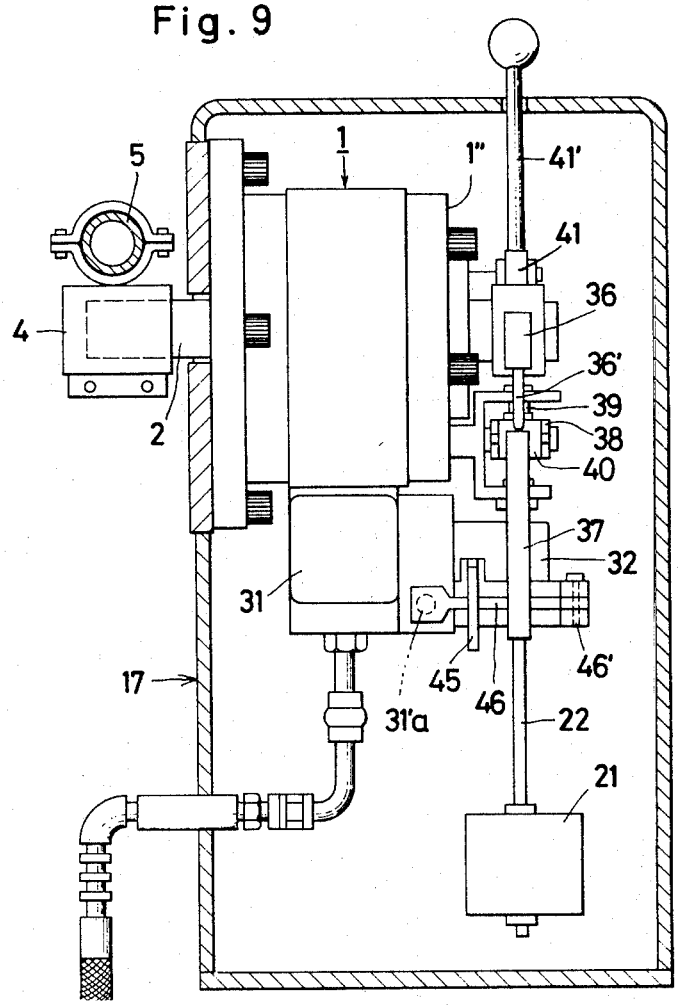
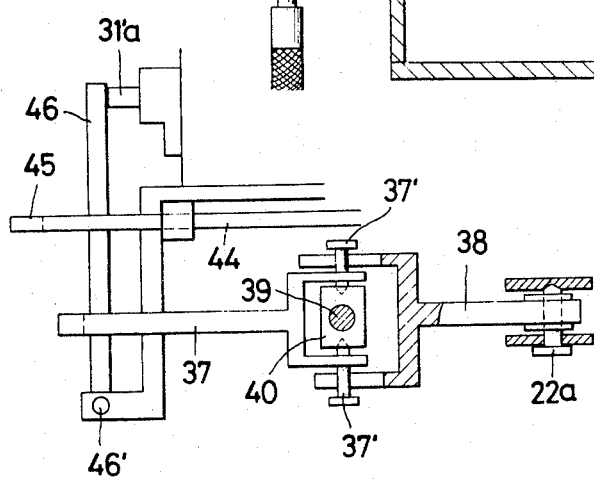

AUTOMATIC FISHING MACHINE

DETAILED DESCRIPTION OF THE INVENTION

This invention relates to an automatic fishing machine for catching skipjack tunas, winter albacores and the like by the use of a fishing pole.

The conventional pole fishing method is such that, when the fishing boat reaches a fishing ground, a number of fishermen stand side by side along the gunwale of the boat, each holding a fishing pole outwardly above the sea, and each fisherman, on sensing the bite of a fish at the fishing hook below the sea surface, swings up the fishing pole to hoist the fish from the sea into the air and, as the fish reaches a point above the boat's deck, jerks the fish off the hook onto the deck and, on release of the fish from the hook, immediately swings the fishing pole back to its original position for the next fish.

Since the conventional pole fishing method thus requires the heavy labor of a large number of fishermen, the recent shortage of manpower, particularly the shortage of fishermen required aboard the fishing boat, and the consequent sharp rise in labor cost are causing a sharp decline in the profitability of fishing operations employing this method. Although there already exist fishing machines for bringing up fish by reeling or by operation of a pole, these conventional machines require the fish to be removed from the hook by hand. Thus, these machines are wholly unsuited to the pole fishing operation in which the hooked fish must be hoisted in rapid succession with the minimum allowable loss of time by reversing the direction of motion of the fishing pole, while the pole is in its upward swing hoisting the hooked fish, thereby removing the fish from hook and, almost at the same instant, returning the hook back to its original position for the next fish.

In the case of a fishing boat using the pole fishing method, the boat, upon arrival at a fishing ground, is compelled to begin fishing even when the sea in that area is rough, because it has only a limited supply of engine fuel and food for the crew. Fishermen standing side by side along the gunwale of the boat in rough seas are exposed to the danger of falling overboard. In the sea where the boat is rolled 2 to 3 meters, the tips of the poles held out from the gunwale above the sea surface are in danger of being plunged into swelling waves and consequently being broken if no allowance is made for the change in distance between the gunwale and the surface of the sea. Thus, each fisherman is required to keep his fishing pole from plunging into the water by moving it up and down in harmony with the rolling motion of the boat.

It is an object of the present invention to propose an automatic fishing machine suited to pole fishing and designed to carry out the fishing operation in the place of fishermen even in harsh weather.

It is another object of the present invention to provide a device whereby the speed at which the fishing pole is swung up upon detection of a bite is as great as possible, this speed and the resilience of the pole being utilized in combination to hoist the hooked fish from the water and send the fish flying along a parabolic locus and the pole being caused to swing down upon detection of the loss of tension in the fishing line when the speed of the fish surpasses the speed of upward swing of the pole to slacken the fishing line and thereby free the fish from the hook to fall on the boat's deck and bring the pole back to its original position.

It is still another object of the present invention to provide a device such that, whenever the rolling motion of the boat tends to vary the height of the pole tip held in the fishing position from the surface of water, the fishing pole is instantaneously moved in proportion to such variation so as to maintain the pole tip at a fixed height and consequently prevent the pole from being broken by the water or the fishing hook from being raised to a level where there are no fish, whereby the fishing can be continued even on rough sea without exposing the fishermen to danger or diminishing the catch.

If the fish remains hooked at the time that the pole is swung back downwardly from the extreme of its upward swing, the fish will be brought back into the water. In such case or when the hook gets caught on the fisherman or on the boat's gear on deck, it is not desirable to continue the downward swinging motion of the pole. Therefore, it is another object of this invention to provide a device to stop the downward swinging motion of the pole upon detection of a tension in the fishing line and to restart the motion upon release of tension from the line, whereby loss of hooked fish, breakage of the fishing pole and fishing line and other dangers are eliminated.

Further, this invention aims to provide a device which, if the hooked fish fails to come free from the hook when the pole is swung back downwardly from the extreme of its upward swing, causes the pole tip to swing upwardly again toward the boat, whereby the hooked fish is lowered to the boat's deck and unhooked by hand.

This invention also aims to provide fishing equipment so designed that one fisherman can attend to a plurality of fishing machines, for example, a total of 10 fishing machines, each of which accomplishes the fishing operation in the place of human hands, whereby the size of the fishing crew may be decreased to a substantial extent.

The other objects of this invention will become apparent from the more detailed disclosure made hereinafter of preferred embodiments of this invention with reference to the accompanying drawing.

FIG. 1 is a schematic front elevation of the machine proper;

FIG. 2 is a side elevation illustrating a part of the said machine proper;

Figure 8:
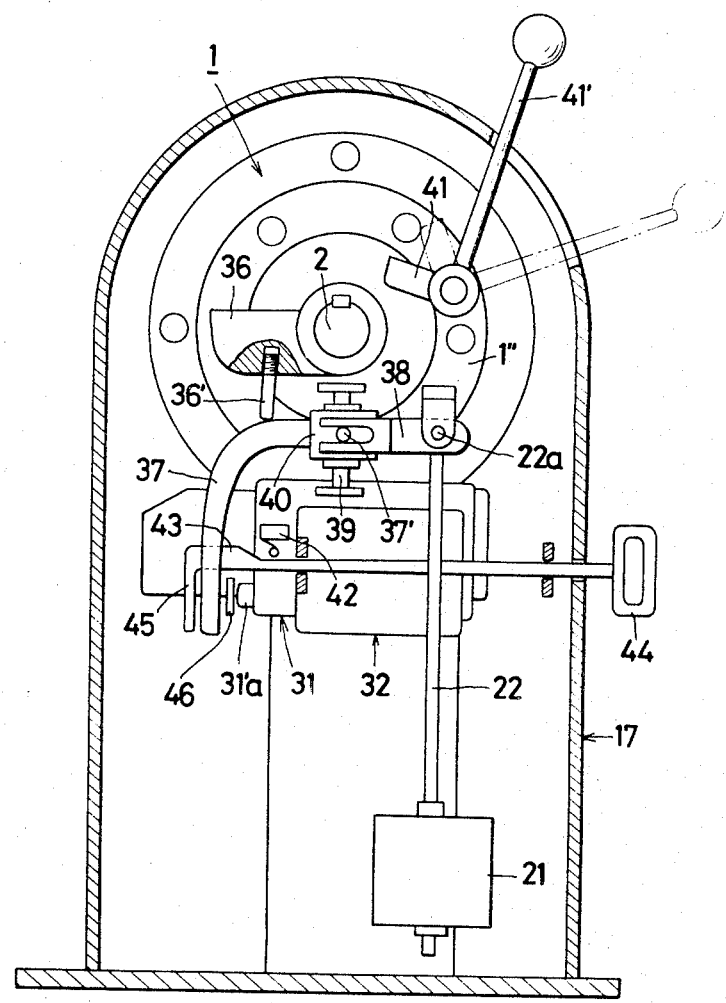
Figure 11:
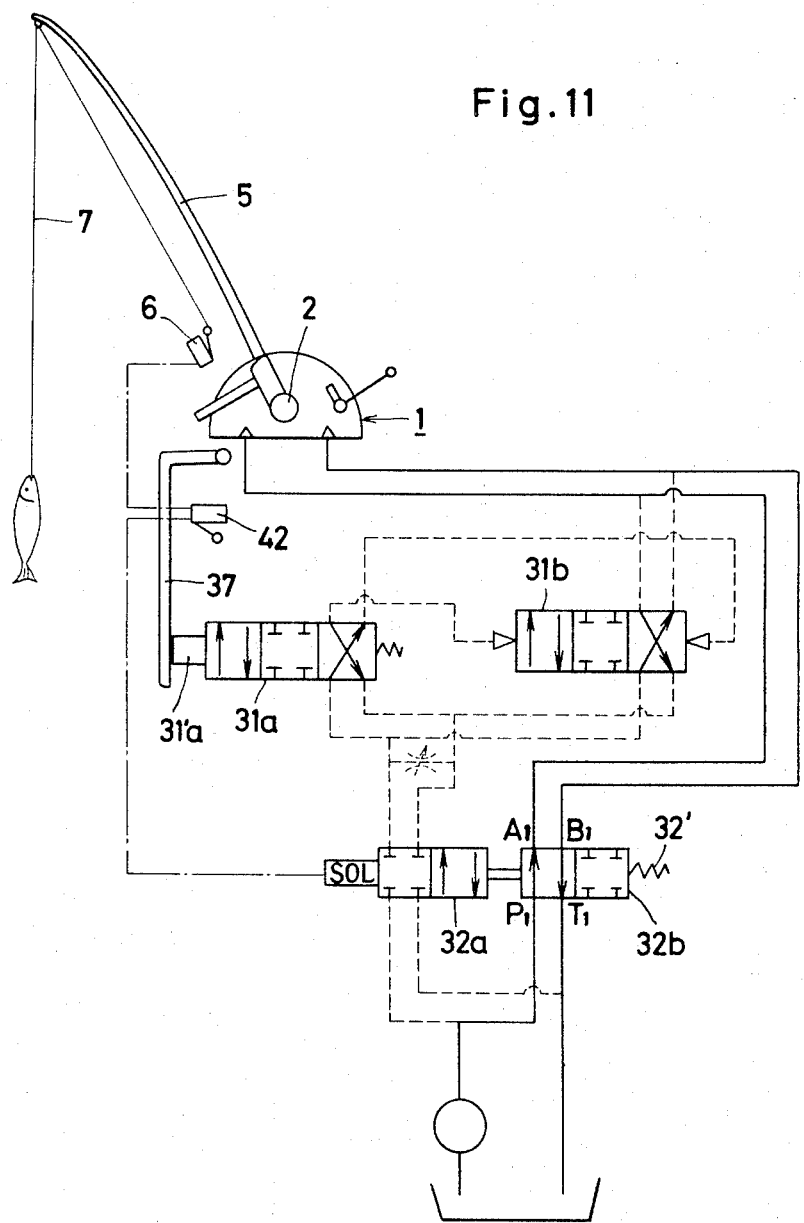
Figure 12:
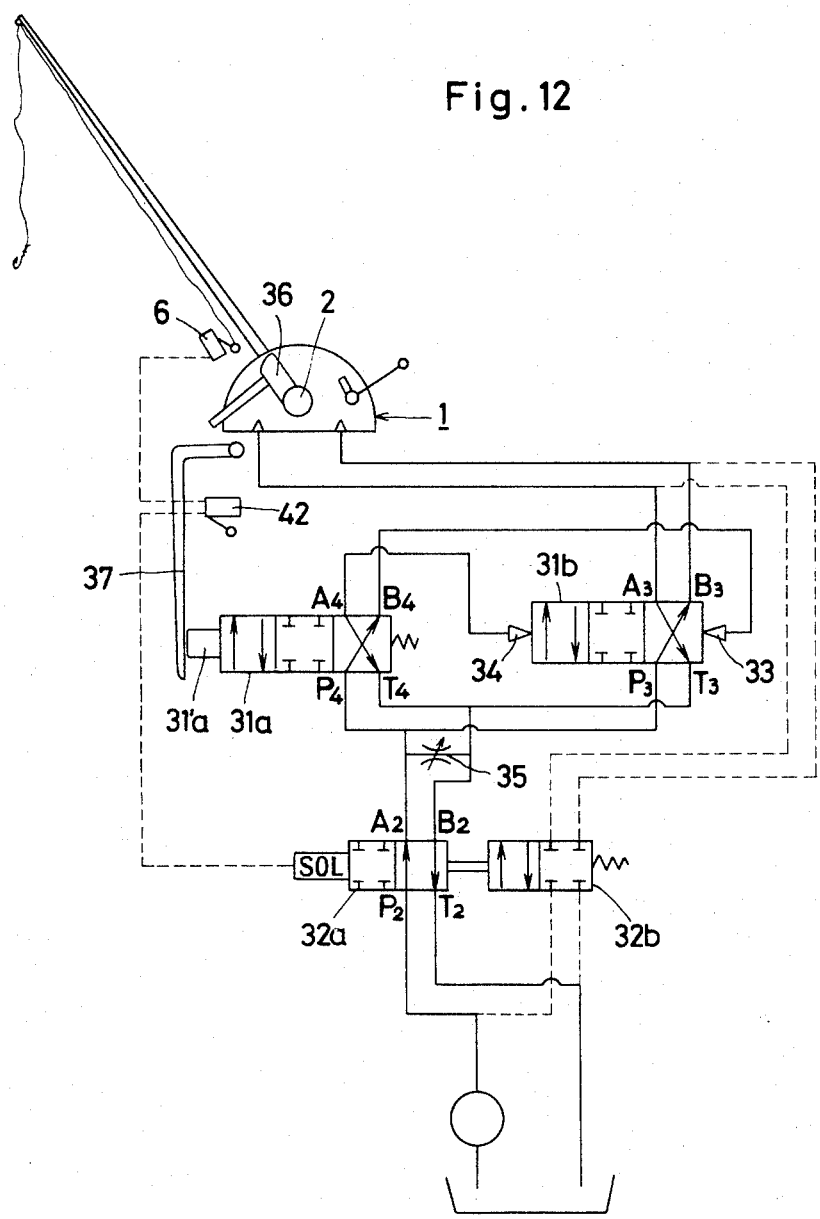
Figure 13:
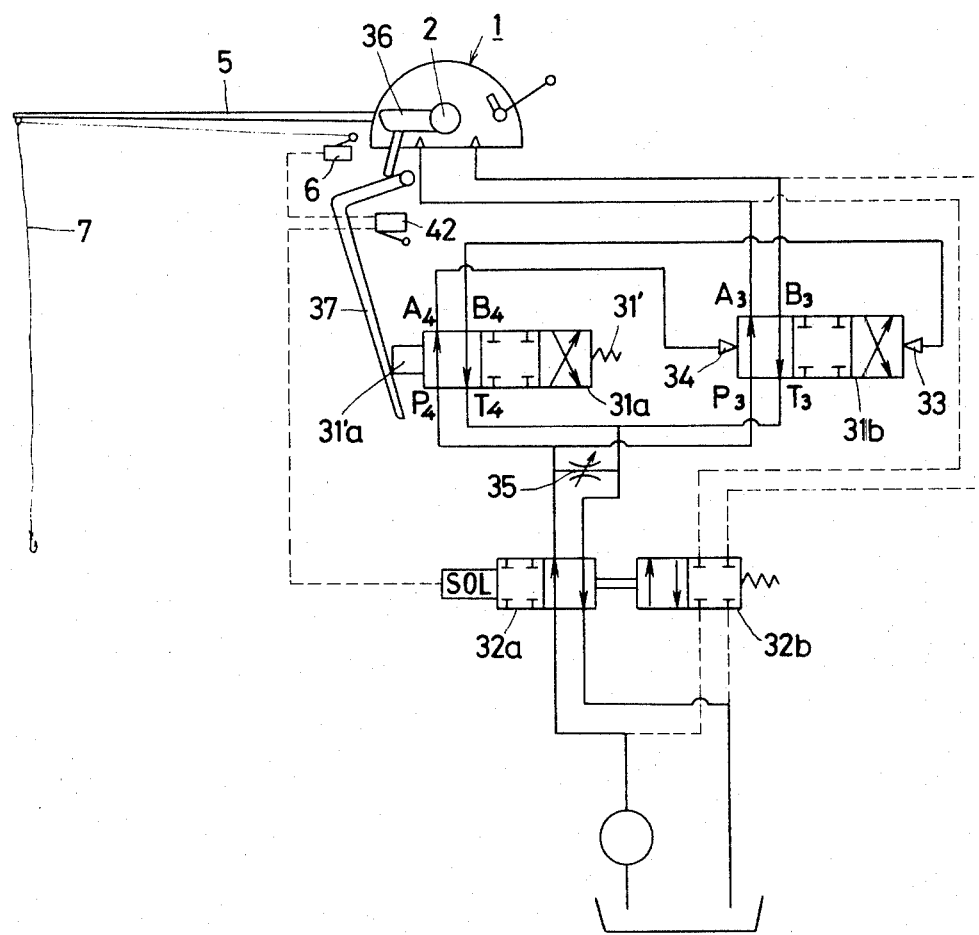
Figure 14A:
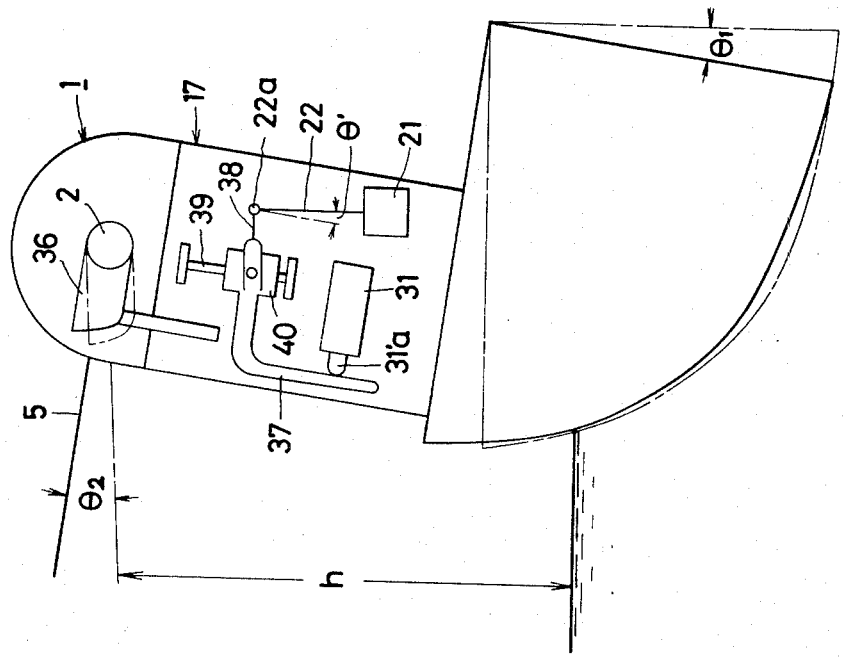
Figure 14B:
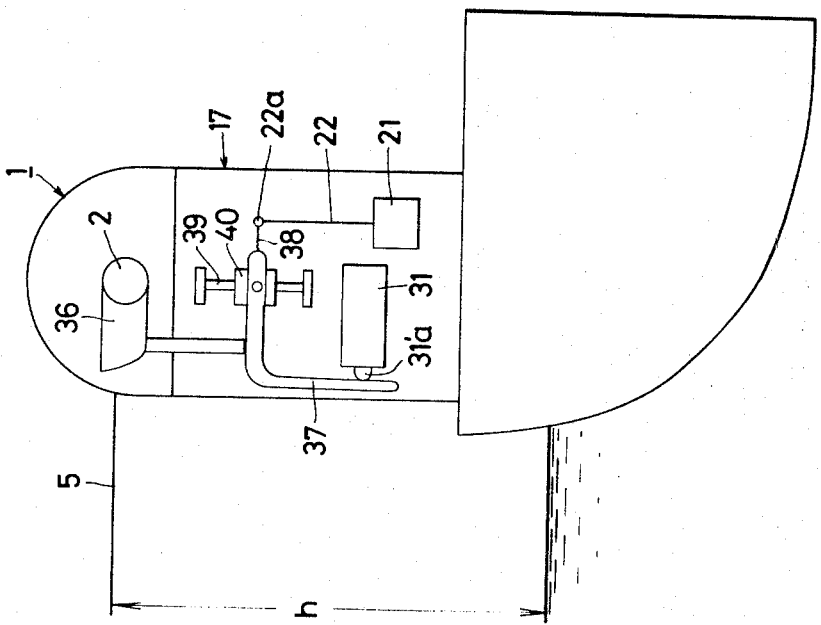
Figure 15:
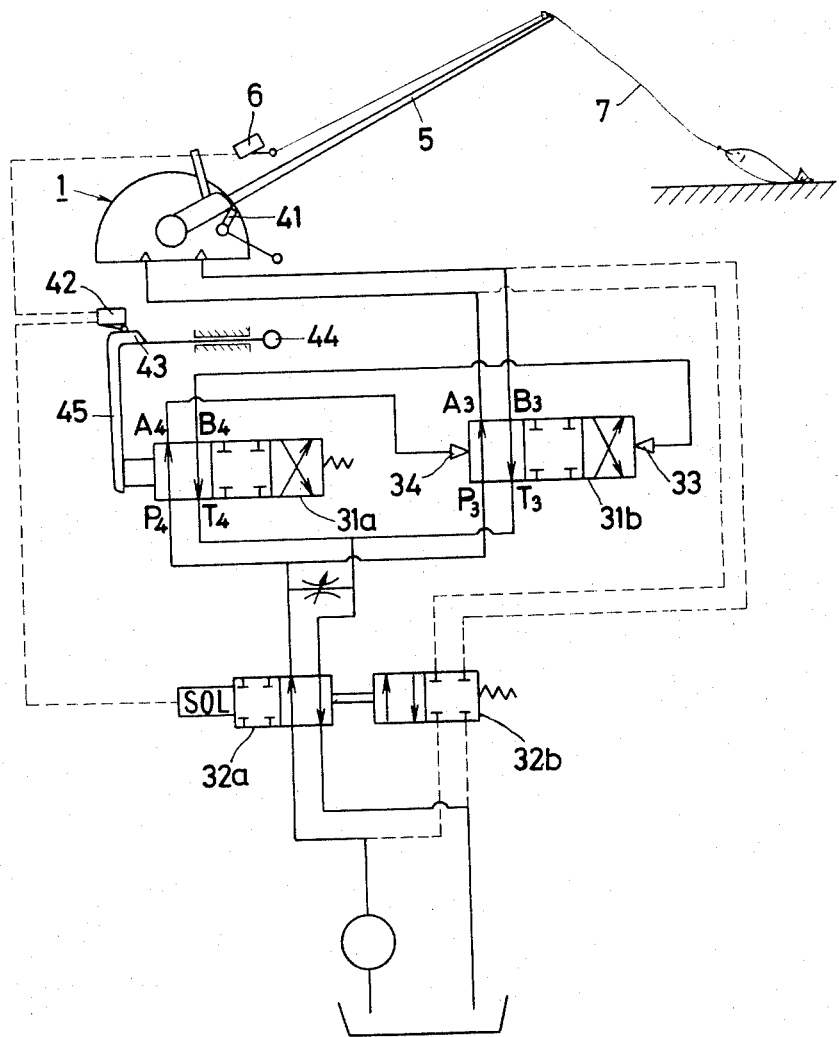

FIG. 8 through FIG. 15, incl., represent a second preferred embodiment. FIG. 8 is a rear view of the machine proper;

FIG. 9 is a side elevation of the said machine proper;

FIG. 10 is a plan view of a part of the machine proper;

FIG. 11 is a diagram of the hydraulic circuit existing when the pole is being swung upwardly;

FIG. 12 is a diagram of the hydraulic circuit existing when the pole is swung down;

FIG. 13 is a diagram of the hydraulic circuit existing when a jiggling motion is imparted to the pole tip;

FIGS. 14A and B are explanatory diagrams illustrating the operation of the rolling compensator; and FIG. 15 is an explanatory diagram illustrating the condition in which a hooked fish which has failed to come off to hook is lowered to the deck.

Figure 16:
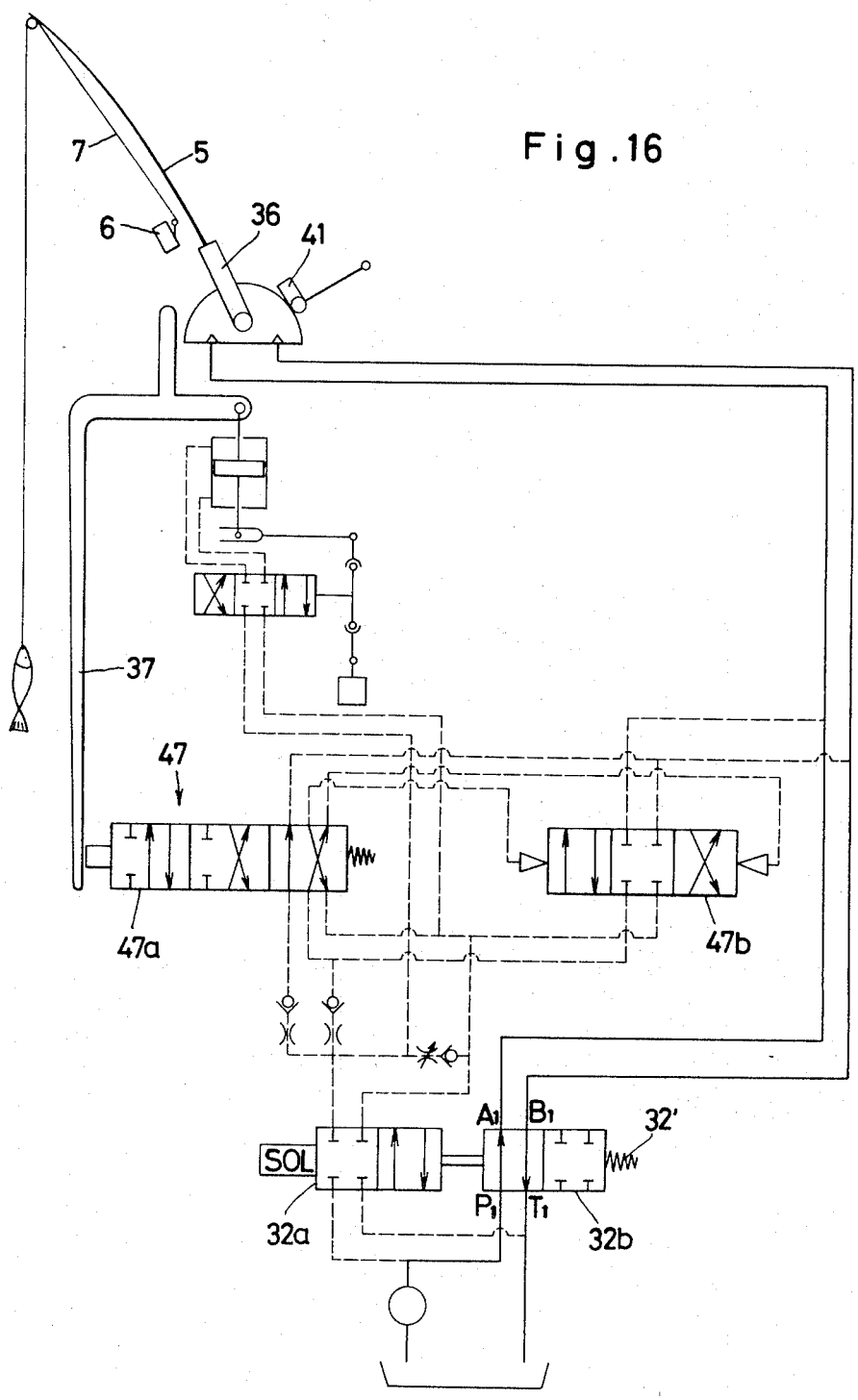
Figure 17:
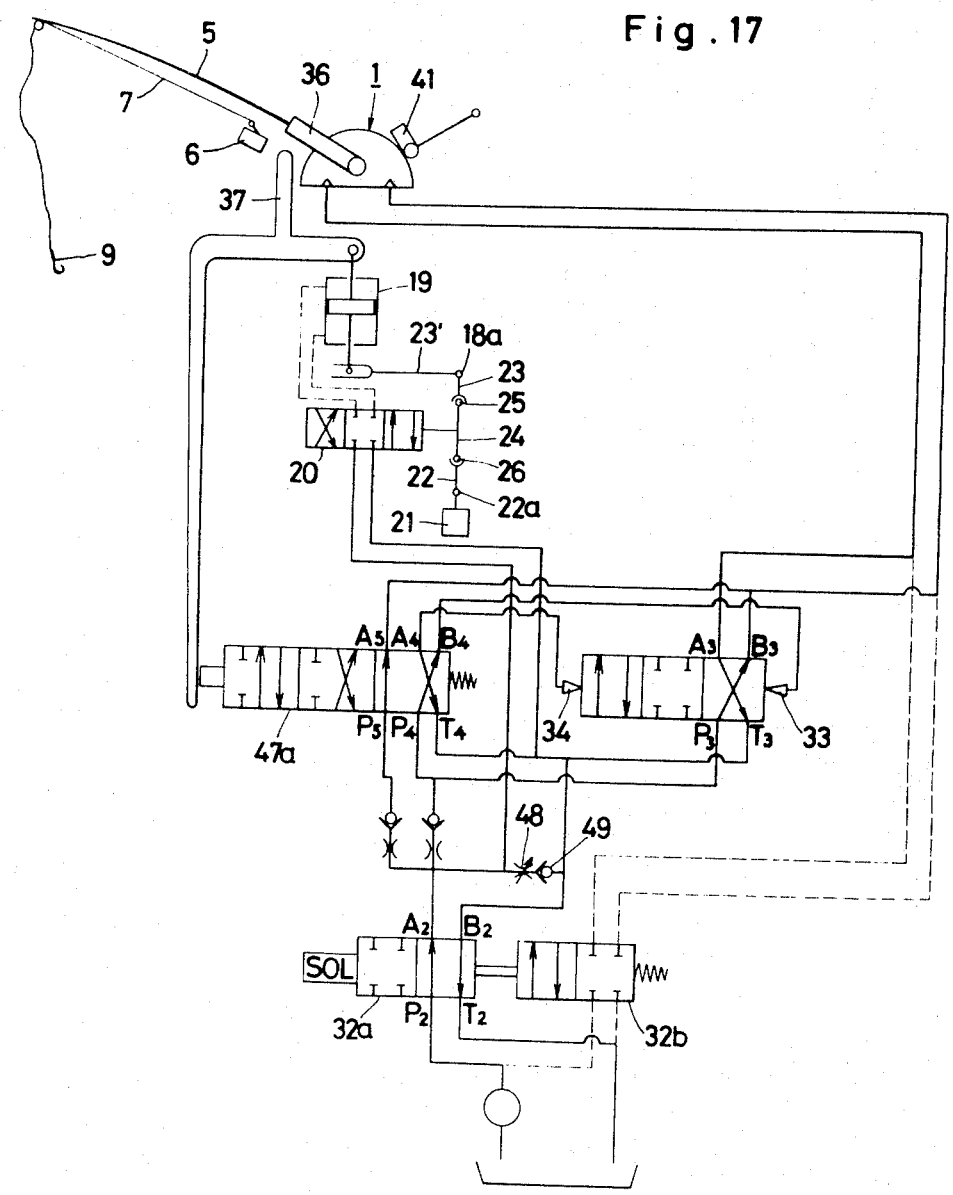
Figure 18:
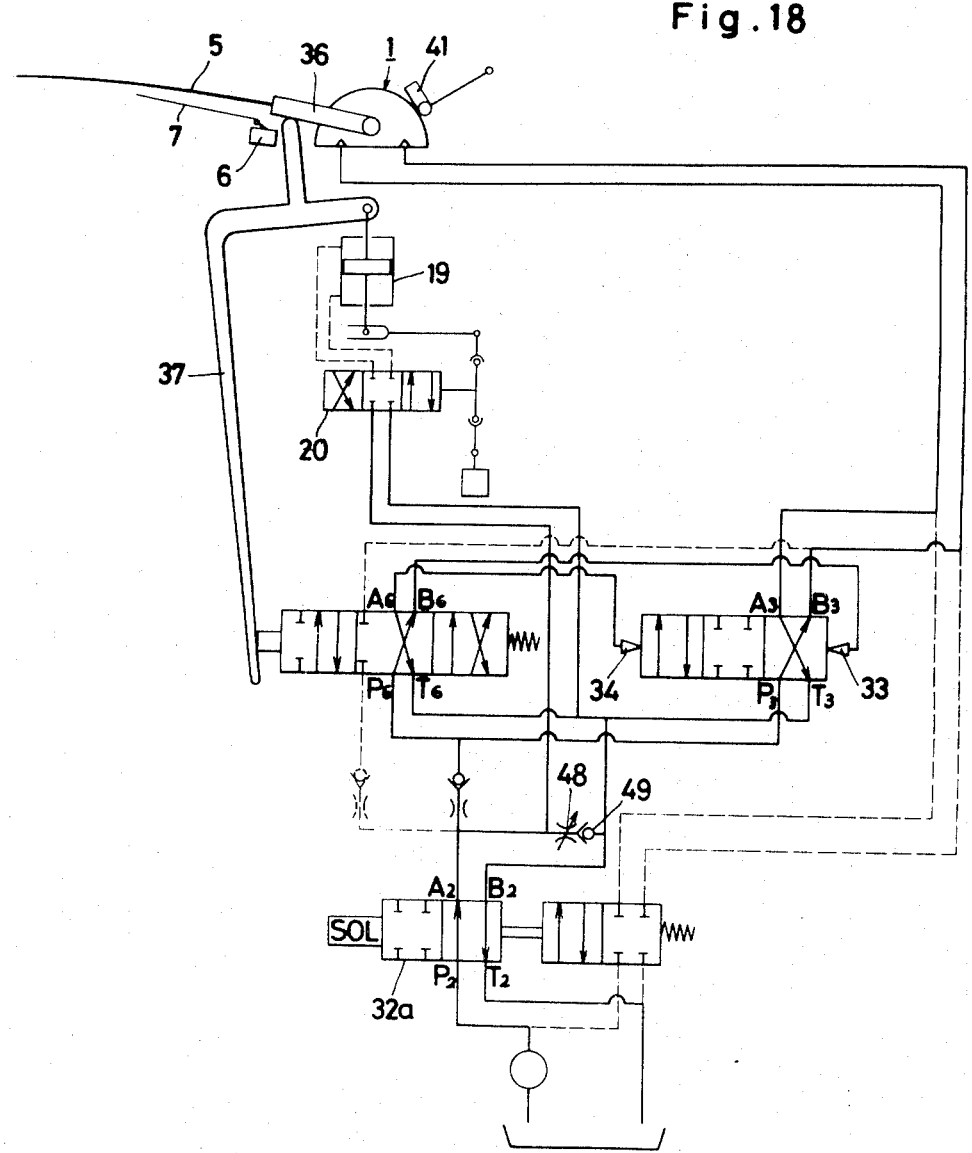
Figure 19:
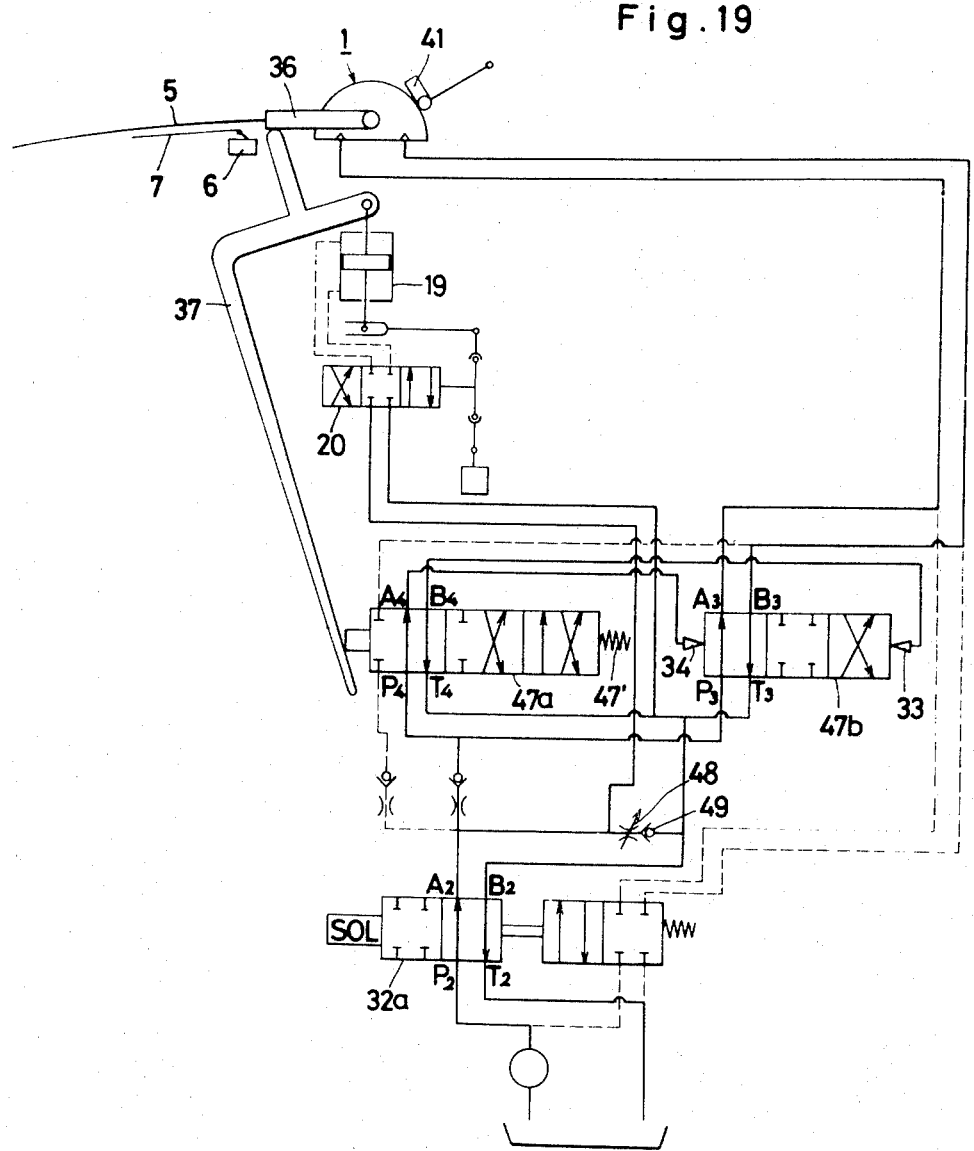
Figure 20A:
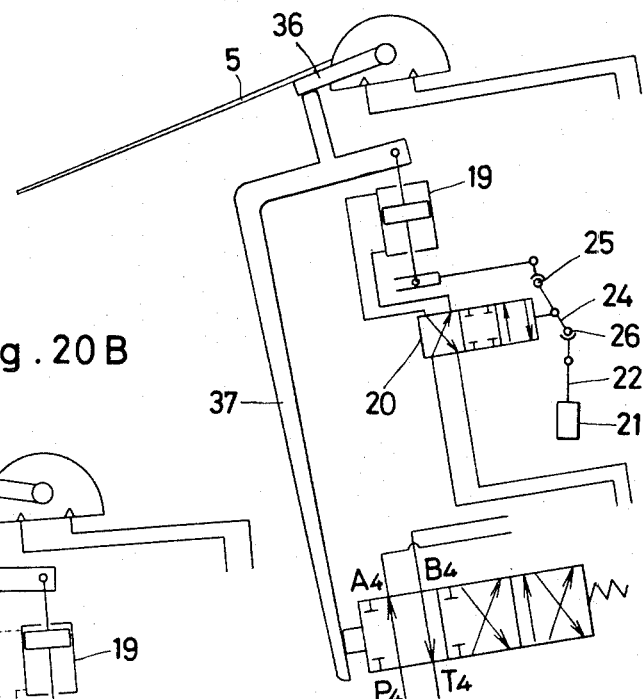

FIG. 16 through FIG. 20, incl., represent a third preferred embodiment which combines the rolling compensator of the first preferred embodiment and a modification of the pole-operating device of the second preferred embodiment. FIG. 16 is a diagram of the hydraulic circuit existing when the pole is swung upwardly, FIG. 17 is a diagram of the hydraulic circuit existing when the pole is swung downwardly;

FIG. 18 and FIG. 19 are diagrams of the hydraulic circuit existing when the jiggling motion is being imparted to the pole tip; and FIGS. 20A and B are explanatory diagrams illustrating the operation of the rolling compensator.

In the first preferred embodiment depicted by FIG. 1 through FIG. 7, 1 denotes a reversible rotary hydraulic actuator such as a hydraulically operated torque cylinder, fitted with a rotary shaft 2. By virtue of the direction controlling valve 3 connected to the hydraulic circuit thereof, rotary shaft 2 of the torque cylinder 1 can be made to rotate either clockwise or counterclockwise with reference to the diagram of FIG. 1. When the direction controlling valve 3 is in neutral position as illustrated in FIG. 4A, however, the cylinder 1 is restrained so as to impede the rotation of the rotary shaft 2.

At one end of the said rotary shaft 2 which protrudes through one side panel 1' of the torque cylinder 1, there is fitted a holder 4 which is adapted to interchangeably receive and firmly grip the butt of fishing pole 5. On the said holder 4, there is fixed a microswitch 6 separately.

The pole 5 has such degree of resilience that it is bent by the pull of the hooked fish struggling in the water and becomes straight again when the fish is brought out of the water. It has guides 8 fixed at intervals for holding a fishing line 7 parallelly thereto. The fishing line 7 is passed through the guides 8, with one end fastened to an operating lever 6' of the switch 6 and the other end drawn out in required length from the tip of pole 5 to suspend a hook 9. If pole 5 is made hollow, the fishing line 7 may be sent through the inside thereof and drawn out in required length from the tip thereof.

The aforementioned direction controlling valve 3 is so designed that, when the two solenoids 3a and 3b are both in an unexcited state, the valve is retained in its neutral position to block the ports P and T of the hydraulic circuit and the ports A and B of the torque cylinder 1 and the rotary shaft 2 is thereby impeded from rotation. When the solenoid 3a is excited, connection is established between the ports P and A and between the ports B and T, causing the rotary shaft 2 to rotate clockwise and the pole 5 to swing upwardly. When the solenoid 3b is excited, connection is established between the ports P and B and between the ports A and T, causing the rotary shaft to rotate clockwise and the pole 5 to swung downwardly. Therefore, the direction controlling valve 3 constitutes an actuator which serves the purpose of controlling the torque cylinder 1 to swing up and swing down the pole 5 as well as to bring it to a stop.

To the said port B, a throttle 11 having a variable or invariable aperture is connected in parallel with a check valve 10, so that, when the pole is in the process of upward swing, the check valve 10 is pushed open to permit transmission of hydraulic pressure and, when the pole is in the process of downward swing, the hydraulic pressure is allowed to be transmitted only through the throttle 11. Thus, the rotating speed of the rotary shaft is substantially higher when the pole is in the upward swing than when it is in the downward swing.

Limit switches 13a and 13b of the type regularly held in their ON state are disposed on the aforementioned side panel 1' of the torque cylinder and connected to the excitation circuits 12a and 12b respectively of the said solenoids 3a and 3b. On the rotary shaft, there is fixed an actuator 14 which operates to turn off the said two limits 13a and 13b in such way that the upward swing of pole is stopped by turning off the switch 13a and the downward swing of pole is stopped by turning off the switch 13b.

The aforementioned circuits 12a and 12b are connected in parallel arrangement to the power source. The microswitch 6 is drawn by a spring 6'' so as to connect the circuit 12b constantly to the power source (FIG. 3A). Only when a load is applied to impart tension to the fishing line as when a fish bite at the hook, the circuit 12a is brought into connection with the power source (FIG. 3B). The magnitude of the load necessary to actuate the microswitch 6 can be adjusted by selecting the resilience of spring 6''.

While the pole 5 is in the lowered position awaiting a bite, the microswitch 6 keeps the power source in connection with the circuit 12b and the actuator 14 retains the limit switch 13b in its OFF position in the circuit 12b. Thus, neither the solenoid 3b of the direction controlling valve 3 nor the solenoid 3a operates and, as a consequence, the ports P and T and the ports A and B are blocked to keep the pole in its lowered position where it waits for a fish to bite. When a fish is hooked, the fishing line tenses and causes the lever 6' to cut in the microswitch 6, bringing the circuit 12a into connection with the power source.

Therefore, the circuit 12a of the solenoid 3a is closed via the limit switch 13a which is turned on consequently, permitting the direction controlling valve 3 to establish connection between the ports P and A and the ports B and T. As a result, the rotary shaft 2 is rotated clockwise to swing up the pole 5 (FIG. 4B).

Figure 3:
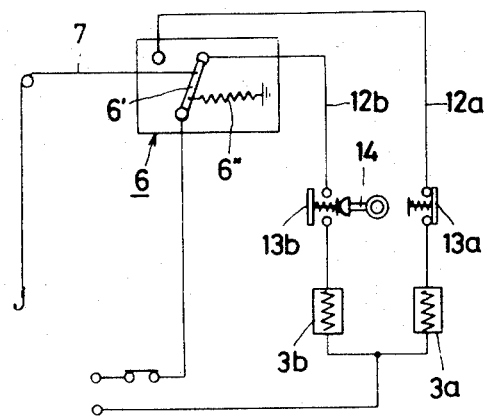
FIG. 3A is a diagram of the electric circuit existing when the fishing pole is in the waiting position.
FIG. 3B is a diagram of the electric circuit existing when a fish has bit at the hook.
Figure 3:
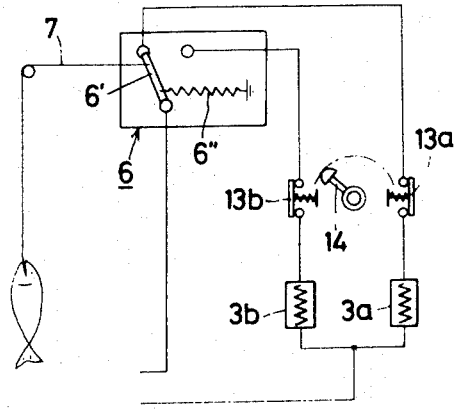
Figure 4:
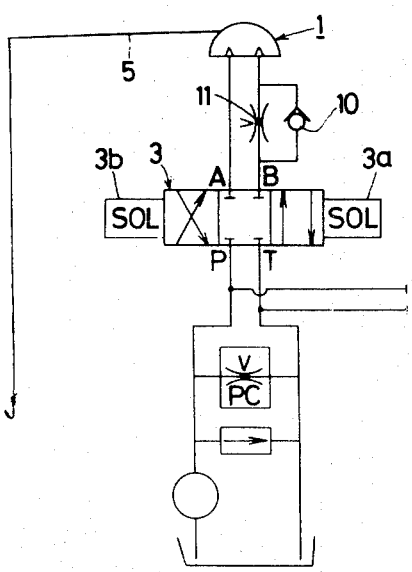
FIG. 4A is a diagram of the hydraulic circuit existing when the fishing pole is in waiting position.
FIG. 4B is a diagram of the hydraulic circuit existing when the pole is being swung upwardly to hoist the hooked fish from the water.
Figure 4:
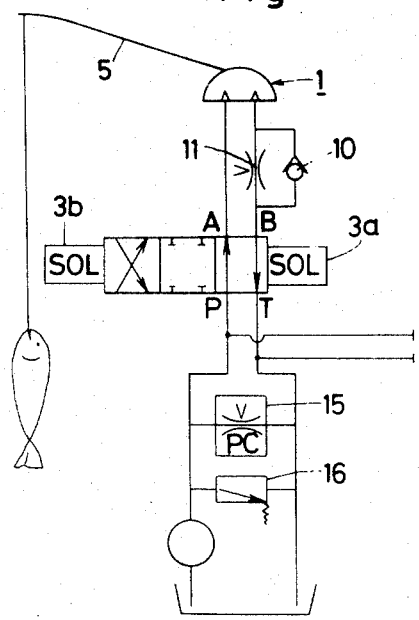
Figure 5:
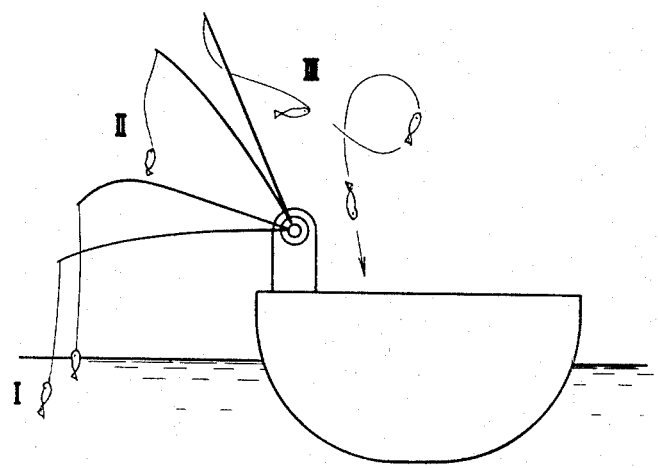
FIG. 5 is an explanatory diagram illustrating the hoisting of a hooked fish.
Figure 6A:
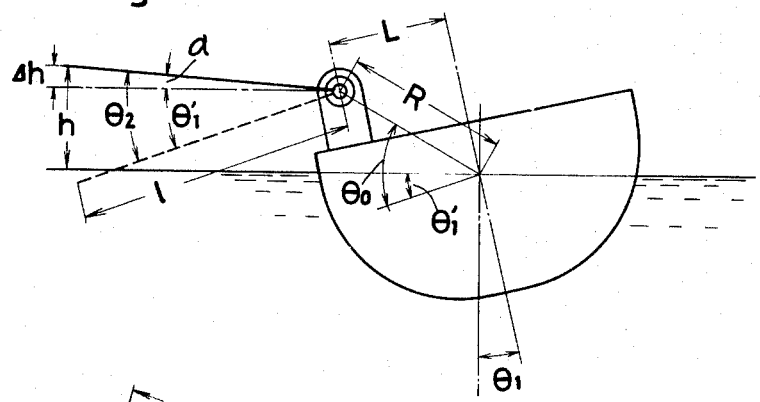
FIGS. 6A and 6B are explanatory diagrams illustrating the operating principle of the rolling compensator.
Figure 6B:
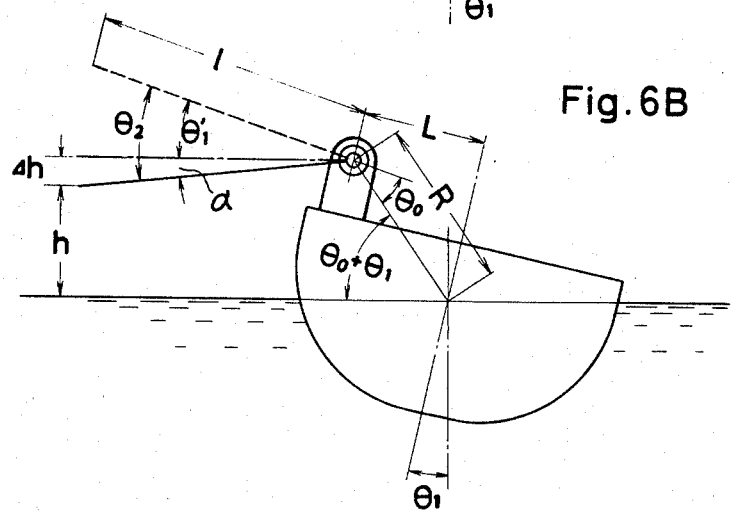

The condition in which a fish is hoisted is explained with reference to FIG. 5. When a fish bites at the hook at the point I, the pole is immediately swung upwardly at a high rate of speed, setting hook 9 in the fish's mouth. Then, the pole 5 pulls at the fish with the aid of the line 7 and it is bent greatly by the resistance resulting from the fish struggling in the water. As the fish is brought out of water, the resistance is reduced and the pole 5 recovers its straightened state abruptly. The resilience sharply accelerates the upward motion of the fish and, at the point II, the speed at which the fish is flying exceeds the speed of the upward swing of the pole and the fish is in a substantially horizontal position. In this condition, the pole recovers its straightened state and the line slackens. Consequently, the spring 6'' pulls the switch 6 to its original position, bringing the circuit 12b into connection with the power source, with the result that the solenoid 3b is actuated to confer a downward swing on the pole. Thus, the pole is stopped momentarily. In the meantime, the fish keeps flying toward the boat and flies past the pole, at which time a slow downward swing is given to the pole so that, at the point III, the hook is drawn backwardly and consequently extracted from the fish's mouth. By virtue of the reaction caused by the extraction of the hook, the fish spins in the air and falls onto the boat's deck.

The downward swing of the pole continues to bring the hook back into the water again. This downward swing stops when the actuator 14 turns the limit switch 3b off.

Thus, the present invention causes a hooked fish to be hoisted out of the water and sent flying in the air describing a parabolic locus. Therefore, it is apparent that the length of the said locus is determined by the resilience of the pole, the initial velocity at which the pole is swung upwardly and the angle at which the hooked fish is hoisted. In order to ensure the safe fall of fish on the deck, therefore, a flow volume controlling valve 15 for adjusting the angular velocity of torque cylinder 1 is incorporated in the hydraulic circuit so that the speed at which the hooked fish is hoisted may be regulated in harmony with the resilience of the pole.

When the fish refuses to come off the hook even after the pole has started its downward swing or when the hook gets caught on the fisherman or the ship's gear on deck, the load thus exerted on the line causes the microswitch 6 to snap back and bring the circuit 12a into connection with the power source. Consequently, the pole is once again swung upwardly and, as the actuator 14 turns the limit switch 13a off, it is brought to a stop. The fisherman need only to free the hook after the pole has ceased its upward motion. On removal of the fish, the switch 6 automatically brings the circuit 12b to connection with the power source, with the result that the pole is swung downward to its original position awaiting the next bite.

In the hydraulic circuit, a relief valve 16 is provided in parallel with the aforementioned flow volume controlling valve 15 so as to permit escape of possible overload.

The tip of the pole must be maintained at a fixed height from the surface of the water even when the ship rolls. For this purpose, pivoted table 18 is supported by means of a fulcrum 18a on a stationary frame 17 which is fastened to the boat's deck. The torque cylinder 1 and the direction controlling valve 3 are both mounted on the said pivoted table 18. In this case, the fulcrum 18a and the rotary shaft 2 are required to be substantially parallel. The said stationary frame 17 is provided with a hydraulic jack 19 capable of raising or lowering the free end of the pivoted table 18, a servovalve 20 of the type of direction controlling valve capable of actuating the said jack 19, and a roll-sensing arm 22 fitted at its lower end with a weight 21 and supported swingably around a fulcrum 22a. The upper end of the arm 22 and the lower end of the link 23 fixed to the fulcrum 18a are interconnected by a lever with the aid of joints 25 and 26. To this lever 24, there is connected the slide spool 20a of the servo-valve 20.

In its neutral position, the said slide spool 20a blocks the hydraulic circuit leading to the jack 19 and, consequently, restrains the motion of the jack. When it is moved to the left or to the right from the neutral position, the slide spool extends the circuit to the jack 19, causing the jack to move upwardly or downwardly.

When the boat is not rolled (FIG. 7A), the stationary frame 17 remains erect and the servo-valve 20 is in its neutral position. Consequently, the upper surface of the pivoted table 18 rests in a horizontal plane, and the tip of fishing poles held over the water from either of the gunwales are at a height $h$ from the surface of the water. As the boat rolls and the hull is inclined to the left by an angle $\theta_1$, the stationary frame is similarly inclined in the same direction and, as a consequence, the tip of the pole on the left side with reference to the diagram tends either to plunge into the water or to fall to a height smaller than $h$ with reference to the surface of the water.

Figure 7A:
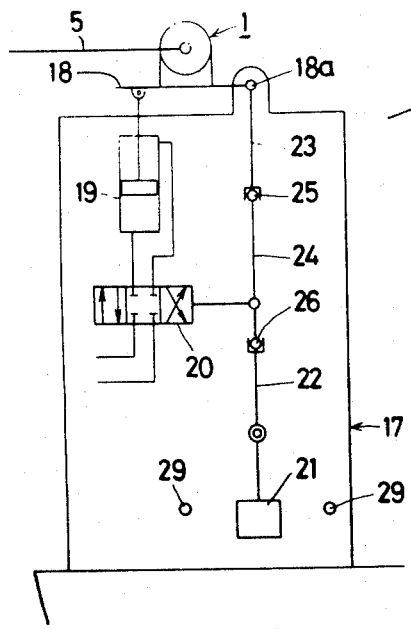
FIG. 7A is a system diagram illustrating the rolling compensator as it exists when the boat is not being rolled.
Figure 7B:
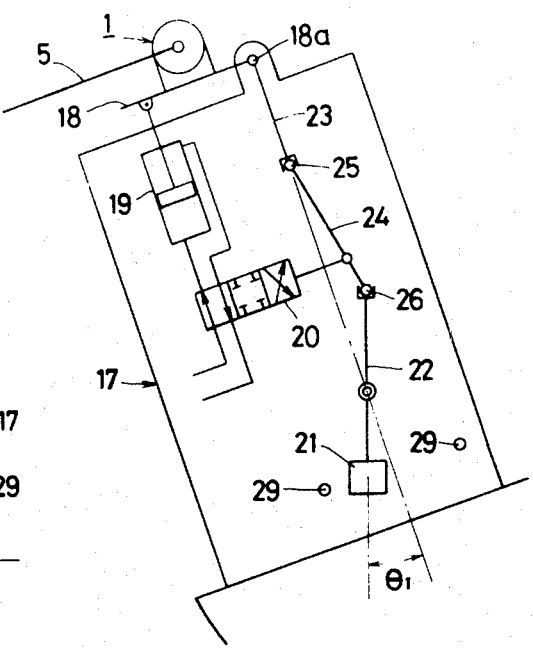
FIG. 7B is a system diagram illustrating the condition in which the rolling compensator is actuated when the boat is rolled to the left.
Figure 7C:
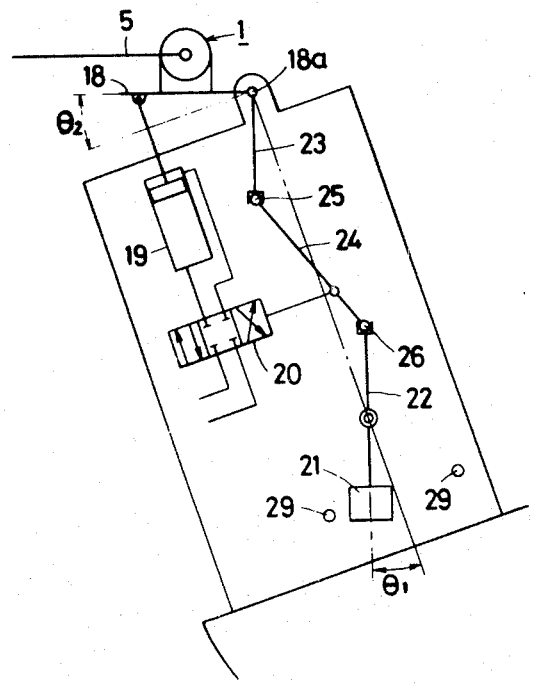
FIG. 7C is a system diagram illustrating the condition of the rolling compensator subsequent to completion of its operation.

At this time, the roll-sensing arm 22 which tends to remains in a vertical position by virtue of the weight 21 turns round the fulcrum 22a, moving the lever 24 around the joint 25 as its fulcrum and pulling the spool of servo-valve 20 of the stationary frame on the left gunwale to the right, with the result that the jack 19 is raised (FIG. 7B). Thus, the pivoted table 18 rotates round the fulcrum 18a and consequently has its free end raised, while the fulcrum 18a moves the lever 24 around the joint 26 as a fulcrum with the aid of the link 23 so as to push the spool 20a in toward the left. As the tip of the pole 5 is raised to a height $h$ from the surface of water, the spool 20a assumes its neutral position, causing the pivoted table 18 to be inclined by a compensating angle $\theta_2$ against the rolling angle $\theta_1$ of the hull.

Since the stationary frame 17 is fixed along the gunwale which is off the center with respect to the rolling, $\theta_1 \neq \theta_2$ when the pole is at the proper elevation.

The value of this $\theta_2$ is obtained approximately by fixing the ratio of length of the roll-sensing arm 22, link 23 and lever 24 with reference to the width of the boat in accordance with the following conditions.

The compensating angle $\theta_2$ is given as follows.

$\theta_2 = \theta_1 \pm \alpha$

Let $\theta_1$ and $\theta_{1'}$ stand for the left and right rolling angles and assume $\theta_1 = -\theta_{1'}$ and there are derived the following equations.

$$R \cos \theta_0 = L \qquad (1)$$
$$R \sin \theta_0 = h \qquad (1)'$$

$$R \sin(\theta_0 \pm \theta_1) = h \pm \Delta h \qquad (2)$$
$$l \sin\alpha = \Delta h \qquad (3)$$

Hence, the formula (2) is expressed as follows:
$$R \sin\theta_0 \cdot \cos\theta_1 \pm R \cos\theta_0 \cdot \sin\theta_1 = h \pm l \sin\alpha$$
$$H \cos\theta_1 \pm L \sin\theta_1 = H \pm l \sin\alpha$$
therefore,
$$\pm \sin\alpha = [\pm L \sin\theta + h(\cos\theta_1 - 1)]/l$$

Where the rolling angle $\theta_1$ is not very large, the approximate equation $\cos\theta_1 \approx 1$ is regarded to stand good. Hence,
$$\sin\alpha \approx L \sin\theta_1/l$$
$$\approx (L/l)\theta_1 \qquad (4)$$

Although this value of rolling compensation is an approximate one and admits of error, it is found sufficiently practical within the range of rolling angles permitting actual fishing operation.

When the boat is rolled in such way that the tip of the pole is raised to a height greater than the value $h$, the spool of the servo-valve is pushed in toward left to lower the jack. As the tip of pole is brought to the height $h$ from the surface of water, the spool resumes its neutral position and stop the motion of the oscillation table.

On the stationary frame 17, a shaft 27 is passed rotatably across below the level in which the weight 21 is permitted to swing. On this shaft 27, there are provided stoppers 28 adapted to stop the motion of the weight 21 and two stoppers 29 adapted to permit the motion within a limited angle, such as in the range of $\pm \theta_1$, with the stoppers 28 displaced angularly from the stoppers 29 by 180°. While the boat is en route from the port to the fishing ground or conversely from the fishing ground to the port or while the boat is not engaged in fishing, the stoppers 28 are utilized to keep the weight 21 motionless. When the fishing operation is to be started, the shaft 27 is rotated semicircularly and retained at the new position by means of the operation means 30 to permit the stoppers 29 to sense the rolling within the limited range. Thus, the pole position is appropriately regulated to maintain the pole top at a fixed height from the surface of water.

The preferred embodiment depicted by FIG. 8 through FIG. 15 incorporates a device adapted to impart a jiggling motion to the pole while the pole is held in waiting position and a modification such that the compensation for rolling is accomplished by the rotation of the rotary shaft 2 of the torque cylinder. The component parts which are identical to those of the first preferred embodiment are indicated by the same numerals and symbols and are not covered by the following description to avoid unnecessary repetition.

Denoted by 31 is a device consisting of two direction controlling valves 31a and 31b so as to serve the dual purpose of imparting jiggling motion and providing rolling compensation and by 32 a pole operating device of solenoid-operation type consisting of two direction controlling valves 32a and 32b.

The valves 32a and 32b of the said pole operating device are supplementally interrelated with each other so that one of them is blocked when the other opens. The valve 32a, when opened, is connected to the valves 31a and 31b. The valve 31b is further connected to torque cylinder 1. The said valve 31b, which is controlled by the other valve 31a as described hereinafter, normally functions to impart a counterclockwise rotation to the rotary shaft 2 of the torque cylinder via the valve 32a of the pole operating device, causing the pole to be swung downwardly. The other valve 32b of the pole operating device is connected to the hydraulic circuit leading to the torque cylinder in such way that, when in the opened state, it functions to provide a clockwise rotation to the rotary shaft 2. When the solenoid is in its unexcited state, the pole operating device 32 keeps the valve 32a in the opened state and the valve 32b in the blocked state respectively.

When a fish bites at the hook, the fishing line tenses and turns the microswitch on, causing the spools of the valves 32a and 32b of the pole operating device to be moved simultaneously to the right position as shown in FIG. 11. Consequently, the valve 32a is blocked and the hydraulic pressure is transmitted via the ports $P_1$ and $A_1$ of the valve 32b into the torque cylinder, causing the rotary shaft 2 to rotate clockwise and the pole 5 to swing up. Then the hydraulic fluid returns via the ports $B_1$ and $T_1$ of the valve 32 to the tank.

In this case, the hydraulic pressure supplied to the torque cylinder 1 corresponds to the full capacity of the pump in use. Therefore, the rotary shaft 2 is rotated at a high rate, permitting the pole to hoist the fish into the air with the hook securely set in the fish's mouth. As the fish is brought out of the water and the speed at which fish flies upward comes to exceed that of the upward swing of the pole, the fishing line becomes slack. Consequently, the switch 6 is snapped back to its OFF position and the spool of the pole operation device 32 is drawn by the spring 32' to assume its left position, with the result that the valve 32b is blocked and the valve 32a is opened to swing the pole 5 downwardly (FIG. 12). At this point, while the pole is kept motionless momentarily, the fish is sent flying past the pole onto the boat's deck. As the hydraulic pressure is consequently supplied to the torque cylinder via the ports $P_2$ and $A_2$ of the valve 32a and the ports $P_3$ and $B_3$ of the valve 31b and, at the same time, returned to the tank via the ports $A_3$ and $T_3$ of the valve 31b and the ports $B_2$ and $T_2$ of the valve 32a, the pole is swung downwardly and the fish is released from the hook. The resultant reaction spins the fish in the air and sends it flying toward the boat's deck.

In this case, the hydraulic pressure being supplied via the ports $P_2$ and $A_2$ of the valve 32a finds a bypass through the ports $P_4$ and $B_4$ of the valve 31a, acts on the valve 31b in the direction indicated by the arrow mark 33 and finds the outlet indicated by arrow mark 34. Thus, it passes through the ports $A_4$ and $T_4$ of the valve 31a and joins itself to the portion of hydraulic pressure returning via the ports $A_3$ and $T_3$. Since a throttle 35 with a variable or invariable aperture is inserted in the form of a short-circuit between the ports $A_2$ and $B_2$ of the valve 32a, the amount of hydraulic fluid required for conferring a downward swing to the pole can be bypassed therethrough to the tank. That is to say, the downward swing of the pole 5 is accomplished at a substantially lower speed than the upward swing thereof.

When the pole 5 is swung downwardly and the actuator 36 provided on the periphery of the rotary shaft 2 consequently operates to push the lever 37 and move the spool 31a' of the valve 31a to the right past its neutral position until it assumes the left position (as illustrated in FIG. 13), a part of the hydraulic pressure from the valve 32a transmits itself through the ports $P_4$ and $A_4$, acts on the valve $31b$ in the direction indicated by the arrow mark 34 and pushes the valve $31b$ to the right into its left position. Then, it returns to the tank via the ports $B_4$ and $T_4$ in the direction indicated by the arrow mark 33. Therefore, the remainder of the hydraulic pressure from the valve $32a$ returns to the tank via the ports $P_3$ and $A_3$ of the valve $31b$, the torque cylinder 1 and the ports $B_3$ and $T_3$, causing the rotary shaft of the torque cylinder to be rotated at a low rate of speed in the direction for raising the pole.

When the pole 5 is swung upwardly and the contact is broken between the actuator 36 and the lever 37, the spool $31a'$ of the valve $31a$ is returned to the right position by virtue of the resilience of the spring $31'$. Consequently, the hydraulic pressure acts on the valve $31b$ in the direction indicated by the arrow mark 33 and the spool is returned to its right position, with the result that the rotary shaft 2 begins to rotate in the opposite direction to lower the pole again.

In short, when the pole 5 is swung downward and the actuator 36 presses down the lever 37, the pole is allowed to rise slightly and, as a consequence, the actuator is separated from the lever 37, allowing the pole to start going down again. Thus, a jiggling motion is generated at the position where the pole is swung downward the second time, attracting the fish to the hook.

No matter whether the fish bites at the hook while the pole is in its upward motion or in its downward motion, the microswitch 6 in its ON position operates the pole operating device 32 electromagnetically and causes the pole to be swung upwardly immediately, with the hooked fish hoisted consequently. When the fish is hooked while the pole is in its upward motion, the abrupt upward swing of the pole separates the actuator 36 from the lever 37 and the valve $31a$ is consequently returned to its right position by virtue of the spring $31'$ and retained at that position waiting for the pole to swing down. When the fish is hooked while the pole is in its downward motion, the valve $31a$ which has already been returned to its right position by the spring $31'$ remains in that position waiting for the pole to swing down.

Moreover, the jiggling action is suppressed to a suitably low speed by the effective function of the throttle 35.

The amplitude of the said jiggling action may be fixed by suitably adjusting the relative position between the lever 37 and the spool end of the valve $31a$ or between the actuator 36 and the lever 37. In the present preferred embodiment, such adjustment can be accomplished by imbedding a screw $36'$ on the actuator 36 and suitably selecting the position at which the lever 37 is brought into contact therewith.

In this embodiment, the torque cylinder 1 is stationarily fixed to the stationary frame 17 together with the valves of the devices 31 and 32 and the lever 37. Consequently, when the boat is rolled, the rotary shaft 2 is rotated so as to maintain the pole tip at a fixed height from the surface of water.

Therefore, a roll-sensing arm 22 is suspended by means of the fulcrum $22a$ from the stationary frame 17 or the side panel $1''$ of the torque cylinder and the forward end of the anteriorly extended portion 38 of the said arm 22 is connected to the rear end of the lever 37.

As is clear from FIG. 10, the anteriorly extended portion 38 of the arm 22 is provided with a yoke which is fastened to the pins $37'$ on the lateral sides of the lever 37. Further, the lever 37 is pivotally fixed with the said pins $37'$ to the slider 40 adapted to slide along the guide 39 provided in the longitudinal direction on the side panel $1''$.

When the boat rolls in either direction, the weight 21 enables the arm 22 to remain in its vertical position. Therefore, the relationship between the arm 22 and the anteriorly extended portion 38 remains constant. It is clear from FIG. 14B that, when the boat is inclined to the right, the machine on the left side is tilted to the right at a position higher than the level at which it stands when the boat is horizontal and, therefore, the position at which the lever 37 comes into engagement with the actuator 36 is moved downward with reference to the actuator 36. As the pole 5 is in the process of upward swing, the valve $31a$ is returned by the spring $31'$ to its right position and the hydraulic pressure is supplied to the torque cylinder in such way as to cause the pole to swing downwardly. As the pole begins to go down and the actuator 36 presses down the lever 37, the spool is moved to its left position to start the jiggling action again. While the pole is in its downward motion, the lever 37 is depressed by the actuator 36, allowing the down ward motion of the pole to continue until the spool is moved to its left position. Thereafter, the jiggling action is resumed.

When the boat is inclined to the right, the machine on the right side is tilted to the right at a position lower than the level at which it stands when the boat remains in the horizontal state. Therefore, the lever 37 is held up by the actuator 36 and the spool $31'$ of the valve $31a$ is pushed in to assume its left position, with the result that the pole is allowed to keep its upward motion until the spool is returned by the spring $31'$ to its right position. Thus, the jiggling action is subsequently resumed.

In order to compensate for the rolling angle $\theta_1$ by the angle $\theta_2$ of the pole by angularly rotating the rotary shaft 2, the joint-to-joint lengths of fulcrum $22a$, arm 22 and lever 37 and the ratio of the actuator 36 to the lever 37 have only to be fixed at predetermined values in accordance with the width of the boat.

The compensation for rolling mentioned above is accomplished while the jiggling motion is being imparted to the pole. When the pole is in the process of upward motion, this compensation is not made because the valve $32a$ remains in its blocked state.

If the hooked fish still remains caught on the hook when a down ward swing is imparted to the pole at the extreme of its upward swing, the weight of fish snaps the switch 6 into its ON position to cause the pole to resume its upward swing. To stop the upward motion of the pole thus resumed, the stationary frame 17 is provided behind the torque cylinder 1 with a stopper member 41 adapted to receive the actuator 36. The said stopper member 41 is designed so as to be operated by the lever $41'$ between the first position for allowing the pole to assume a backwardly slanted position and the second position for allowing the pole to take an upwardly slanted position. Normally, the stopper is maintained at the first position. In the solenoid circuit of the pole operating device 32, a switch 42 adapted to be normally maintained in its ON position is connected in parallel arrangement with the switch 6 and fixed onto the stationary frame 17. At the same time, the stationary frame 17 is fitted with a manual operating device 44 capable of turning the aforementioned switch 42 to its OFF position by means of a cam 43. In addition to the said cam, the aforementioned operating device 44 is provided with an operating member 45 which is capable of pushing the spool $31a'$ of the valve to the right thereby causing the valve $31a$ to assume its left position. The aforementioned cam 43 and operating member are interrelated with each other in such way that no action is exerted on either the switch 42 or the valve $31a$ while the operation of the operating device 44 is occuring in the first range, the cam 43 only snaps the switch 42 to its OFF position when the operation is occurring in the second range, and the operating member 45 causes the valve $31a$ to assume its left position and the switch 42 is maintained in its OFF position when the operation is occurring in the third range.

The said manual operating device 44 depicted in the drawing is of a rod type which is pulled in the longitudinal direction to provide the required operation. Further, the spool $31a'$ of the valve $31a$ is opposed to the free end of the arm 46 which is fixed onto the stationary frame by means of the fulcrum $46'$ running parallelly to the guide $39'$, so that the lever 37 and the operating member 45 will exert action upon the said arm 46.

If the hooked fish is not released from the hook, the pole is brought to a stop after being received temporarily in its slanted position by the stopper member 41. At this point, the fisherman is required to turn the operating device 44 from the first to the second range, so that the switch 42 is turned off and solenoid of the valve $32a$ is demagnetized. Thus, the spring $32'$ opens valve $32a$ and blocks the valve $32b$ on the pole operating device 32. In this case, since the valve $31a$ is moved by the spring $31'$ to the position causing the pole to swing downwardly, the pole starts its downward motion and separates from the stopper member 41 when the operating device 44 is set to the second range. If the stopper member 41 is moved by the operating level $41'$ to assume its second position and the operating device 44 is shifted to its third range at the same time, then the valve $31b$ is switched by the valve $31a$ as illustrated in FIG. 15, with the consequence that the device 31 gives an upward motion to the pole and the pole continues to rise until it collides slowly into the stopper member 41 is stopped thereby while the pole operating device 32 is retained in the condition in which the valve $32a$ is opened and the valve $32b$ is blocked. In this condition, the pole is held in its upwardly slanted position above the deck. Thus, the fish struggles on the deck and releases itself from the hook. If the fish fails to unhook, the fisherman removes the fish by hand. On removal of the fish from the hook, the fisherman is required to shift the operating device back to its first range, so that the switch 42 is turned to its On position and the valve $31a$ is moved by the spring $31'$ to assume its proper position. At this point, absence of tension in the line permits the switch 6 to snap back to its OFF position, while the pole operating device 32 assumes a condition in which the valve $32a$ is opened and the valve $32b$ is blocked. Consequently, the pole is lowered again to the original position and waits for the next bite. The valves $31a$ and $31b$ of the present embodiment depicted in the drawing are of the three-position type. They may be of the two-position type, if so desired.

The third preferred embodiment depicted in FIG. 16 through FIG. 20 is so designed as to accomplish the compensation for rolling by angularly rotating the rotary shaft of the torque cylinder by means of the jack of the first preferred embodiment which is controlled by the servo-valve 20 and, at the same time, to impart the jiggling action to the pole as in the case of the second preferred embodiment, while the pole is held in the position waiting for a fish to bite at the hook. Therefore, the component parts which are identical to those of the first and the second preferred embodiment are indicated by the same numerals and symbols and left out of description hereinafter.

The device 31 serving concurrently for imparting jiggling motion to the pole and making the required compensating for rolling in the second preferred embodiment corresponds to the jiggling action device 47 of the third preferred embodiment. In the device 31, both the valves $31a$ and $31b$ are of the three-position four-connection type having the central position blocked. In the said device 47, however, the valve $47a$ is a direction controlling valve of the three-position six-connection type. While the valve $47b$ has its central position blocked, the valve $47a$ has an opened portion in the central position.

When a fish bites at the hook, the microswitch is snapped to its ON position and, consequently, the solenoid is excited to shift the pole operating device, with the result that the hydraulic pressure is transmitted to the torque cylinder via the ports $P_1$ and $A_1$ to the valve $31b$ of the device 32 and then returned to the ports $B_1$ and $T_1$. Thus, the rotary shaft 2 imparts and upward swing to the pole to hoist the fish (FIG. 16). As the load exerted on the line is removed, the device 32 is pushed by the spring $32'$ back to its original position, permitting a part of the hydraulic pressure to be transmitted to the ports $P_5$ and $A_5$ of the valve $47a$ of the device 47 via the ports $P_2$ and $A_2$ of the valve 32 and the remainder of the pressure to be transmitted through the ports $P_4$ and $B_4$. The portion of the hydraulic pressure transmitted through the ports $P_4$ and $B_4$ is further divided into two portion; one portion acts upon the valve $47b$ in the direction indicated by the arrow mark 33 and brings the valve to its right position and then proceeds to the ports $A_4$ and $T_4$ in the direction indicated by the arrow mark 34 while the other portion is transmitted to the ports $P_3$ and $B_3$ because the aforementioned valve $47b$ has already been shifted as mentioned above.

Then, the hydraulic pressure transmitted through the ports $P_5$ and $A_5$ and that transmitted through the ports $P_3$ and $B_3$ are joined. The joined flow of pressure enters the torque cylinder to impart down ward swing to the pole, returns to the ports $A_3$ and $T_3$ and then joins itself to the other flow of pressure transmitted through the ports $A_4$ and $T_4$. Subsequently, the combined flow of hydraulic pressure returns to the tank via the ports $B_2$ and $T_2$ of the valve $32a$ (FIG. 17). Accordingly, the speed at which the pole is swung downward is substantially lower than the speed of the pole's upward motion.

As the pole is swung downwardly and the actuator 36 consequently depresses the lever 37 to move the spool of the valve 47a one position to the right (FIG. 18), the hydraulic pressure transmitted as far as the ports $P_2$ and $A_2$ of the valve 32a is divided into two portions, one portion proceeding to the ports $P_6$ and $B_6$ in the central position of the valve 47a and the other portion to the ports $P_3$ and $B_3$ of the valve 47b.

Then, the portion of hydraulic pressure transmitted through the ports $P_6$ and $B_6$ acts on the valve 47b in the direction indicated by the arrow mark 33 and subsequently returns via the route indicated by the arrow mark 34 and through the ports $A_6$ and $T_6$ of the valve 47a and the ports $B_2$ and $T_2$ of the valve 32a, causing the valve 47b to be maintained in the right position. By contrast, the portion of hydraulic pressure which has been transmitted through the ports $P_3$ and $B_3$ now enters the torque cylinder 1 and returns via the ports $A_3$ and $T_3$ and the ports $B_2$ and $T_2$, causing the pole to be lowered further.

Consequently, the pole is lowered continuously. As the actuator 36 depresses the lever 37 further and moves the spool of the valve 47a one position more to the right (FIG. 19), the portion of hydraulic pressure proceeding through the ports $P_2$ and $A_2$ of the valve 32a passes through the ports $P_4$ and $A_4$ of the valve 47a, then acts on the valve 47b in the direction indicated by the arrow mark 34, switches the valve 47b to its left position, proceeds through the ports $B_4$ and $T_4$ and returns through the ports $B_2$ and $T_2$ of the valve 32a. As a result, a part of the hydraulic pressure being transmitted via the ports $P_2$ and $A_2$ passes through the ports $P_3$ and $A_3$ of the valve 47b and enters the torque cylinder, then returns via the ports $B_2$ and $T_2$ of the valve 32a, causing the rotary shaft 2 to be rotated. Thus, the pole is raised at a slow speed.

When the pole is raised to a certain degree and the valve 47a is pushed by the resilience of the spring 47' one position back in consequence of loss in the force with which the actuator 36 pushes the lever 37, there is assumed the state shown in FIG. 18 in which the pole is lowered.

Thus, the jiggling action continues to exist in the pole so long as the pole is held in the waiting position. When the pole is swung downwardly as illustrated in FIG. 17 and when the jiggling motion is imparted upwardly to the pole as illustrated in FIG. 18 and FIG. 19, a part of the hydraulic fluid which is supplied via the ports $P_2$ and $A_2$ of the valve 32a to the torque cylinder is allowed to proceed through the variable throttle 48 and the non-return valve 49 and find a bypass through the ports $B_2$ and $T_2$. Accordingly, the speed of such action of the pole is lower than that of the upward swing of the pole.

The actuator of the jack 19 fixed on the frame 17 to compensate for the rolling of the boat is of a double-end rod type, with the upper end of the said rod connected to the lever 37 and the lower end thereof connected to the forward end of the anteriorly extended portion 23' of the link 23. Naturally, the link 23 turns around the fulcrum 18a of the stationary frame 17. The connection between the rod and the aforementioned extended portion 23' is required to be made loosely as with a yoke. While the boat remains in its horizontal state, the roll-sensing arm 22 suspended via the lever 24 from the link 23 retains its verticality and the servo-valve 20 consequently is maintained in its neutral position to block the hydraulic circuit leading to the jack 19.

Figure 20B:
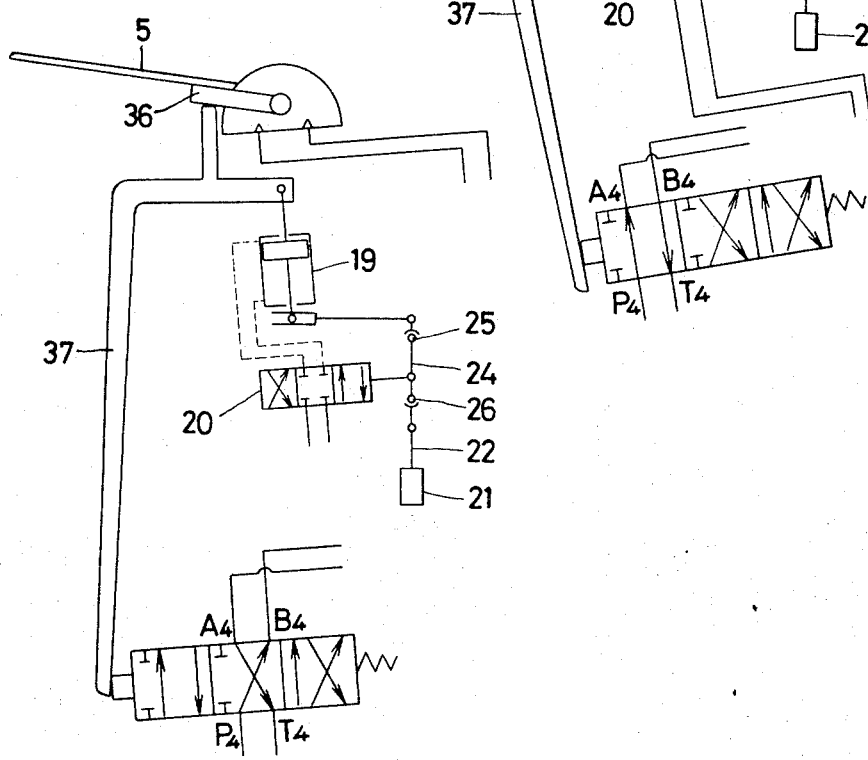

When the boat rolls and consequently decreasing the height of the pole tip from the surface of water, the arm 22 tends to maintatin its verticality with the aid of the weight 21 and move the lever 24 around the joint 25 as a fulcrum. Therefore, the lever 24 pulls the spool of the servo-lever 20 to the right and the jack 19 lifts up the lever 37 as illustrated in FIG. 20A. As a result, the lever 37 is stopped by the actuator 36 and causes the valve 47a to be moved to its left position, permitting the pole to be moved upward in accordance with the upward travel of jiggling action. With the rise of the jack 19, the link 23 moves the lever 23 around the joint 26 as its fulcrum and consequently moves the spool of the servo-valve 20 in the direction of its neutral position (FIG. 20B). As the spool of the servo-valve 20 is returned to its neutral position, the jack stops the upward travel of the lever 37. The upward motion of the pole is brought to a stop when the lever 37 reduces the depressing force applied to the spool of the valve 31a and the valve 31a is returned one position to the left by the resilience of the spring 31'. When the pole is stopped, the jiggling action is imparted thereto.

At this point, the height of the pole tip from the surface of water is substantially equal to the height existing when the boat remains in its horizontal state.

It is evident that, if the boat is inclined so as to increase the height of the pole tip from the surface of water, the jack causes the lever 37 to go down and consequently imparts a downward motion to the pole to compensate for rolling.

The present invention is not limited to the preferred embodiments specifically set forth with reference to the drawing. It may be worked in numerous designs so far as they do not deviate from the spirit of the invention.

What is claimed is:

1. An automatic fishing machine comprising, in combination, a switch adapted to sense the bite of a fish through a line, a suitably resilient pole having the said line held along therewith and extended downwardly from the forward tip thereof, a reversible rotary type actuator adapted to impart an upward swing to the pole, when the said switch senses the bite of a fish, while permitting the said pole to be bent by the pull exerted thereon by the fish struggling in the water and to impart a subsequent downward swing to the pole so as to jerk the fish off the hook, when there occurs a sharp decline in the force of said pull as a result of the fish having been pulled out of the water and sent flying at an accelerated speed which exceeds that of the upward swing of the pole by the action of the pole as it recovers it original straight state, a pole operating means disposed between the said switch and the said actuator and adapted to control the rotating speed of the actuator so as to increase the speed of the upward swing of the pole substantially as compared with the speed of the downward swing of the pole, a roll-sensing arm for detecting the rolling of the ship by means of a weight, and a means cooperating with the said roll-sensing arm for compensating for changes in the height of the pole above the water surface in proportion to the degree of rolling of the ship as the pole is held outwardly from the ship while waiting for a fish to bite.

2. An automatic fishing machine according to claim 1, wherein the actuator is provided on a table rocked controllably by the roll-sensing arm in proportion to the degree of the rolling of the ship detected thereby.

3. An automatic fishing machine according to claim 1, wherein the actuator has a rotary shaft angularly rotated in proportion to the degree of the rolling of the ship detected by the roll-sensing arm.

* * * * *